United States Patent [19]

Quatse et al.

[11] Patent Number: 4,864,531
[45] Date of Patent: Sep. 5, 1989

[54] ERROR CONTROL APPARATUS USING RESTORE MEMORY FOR RECOVERING FROM PARITY DISCORDANCES IN TRANSMISSIONS BETWEEN CONTROLLER AND REAL-TIME I/O DEVICES

[75] Inventors: Jesse T. Quatse, Corte Madera, Calif.; Lionel Heitz, Crolles, France; Jacky Pergent, Carros le Neuf, France; Olivier Penot, Antibes, France

[73] Assignee: La Telemecanique Electrique, France

[21] Appl. No.: 102,255

[22] Filed: Sep. 28, 1987

Related U.S. Application Data

[63] Continuation of Ser. No. 704,246, Feb. 4, 1985, abandoned.

[30] Foreign Application Priority Data

Jun. 3, 1983 [FR] France .............................. 83 09540

[51] Int. Cl.$^4$ ...................... G06F 11/10; G06F 15/46
[52] U.S. Cl. .................... 364/900; 364/184; 364/926.93; 364/944.7; 364/944.8; 364/945.6; 371/49.4; 371/67.1; 371/68.3; 340/825.16
[58] Field of Search ... 364/200 MS File, 900 MS File, 364/184, 185; 371/31, 49, 67; 340/825.16

[56] References Cited

U.S. PATENT DOCUMENTS

| 4,216,460 | 8/1980  | Baldwin et al. ...................... 371/57 |
| 4,254,473 | 3/1981  | Galdun et al. ...................... 364/900 |
| 4,291,408 | 9/1981  | Ogawa et al. ...................... 371/49 |
| 4,302,820 | 11/1981 | Struger et al. ...................... 364/900 |
| 4,429,299 | 1/1984  | Kabat et al. ...................... 340/310 R |
| 4,507,784 | 3/1985  | Procter ...................... 371/61 |
| 4,511,975 | 4/1985  | Nozawa et al. ...................... 371/49 |
| 4,531,213 | 7/1985  | Scheuneman ...................... 371/3 |
| 4,556,958 | 12/1985 | Ugon ...................... 364/200 |

FOREIGN PATENT DOCUMENTS 54-103643 8/1979 Japan .
56-121124 9/1981 Japan .

*Primary Examiner*—Archie E. Williams, Jr.
*Assistant Examiner*—Thomas C. Lee
*Attorney, Agent, or Firm*—William A. Drucker

[57] ABSTRACT

An input/output device monitors the transmission of information between a processor of a programmable controller and sensors and actuators of a process to be controlled. This device includes electronic circuits adapted for calculating the parities of the digital words which pass therethrough, these parities being compared with corresponding parities calculated by the processor which thereafter invalidates the words having two different parities.

2 Claims, 6 Drawing Sheets

ERROR CONTROL APPARATUS USING RESTORE MEMORY FOR RECOVERING FROM PARITY DISCORDANCES IN TRANSMISSIONS BETWEEN CONTROLLER AND REAL-TIME I/O DEVICES

This application is a continuation of application Ser. No. 704,246, filed Feb. 4, 1985, now abandoned.

BACKGROUND OF THE INVENTION

1. Field of the Invention

The present invention relates to a process and device for monitoring the transmission of information between the central unit of a programmable controller and the input/output circuits connected to the sensors and/or to the actuators of the process controlled by said controller. It also relates to a process for updating an input image memory with respect to the inputs, and of the outputs with respect to an output image memory.

2. Description of the Prior Art

Generally, it is known that a programmable controller uses a processer for ensuring the ordered control of the actuators of the process as a function of the information supplied by the detectors, and this according to an operating sequence determined by a program.

For providing its connection with the process, the controller comprises a plurality of connecting elements broken down into two assemblies: namely:

an assembly of input connection elements to which the detectors or the sensors are connected, and an assembly of output connection elements to which the actuators of the process are connected.

The processor conventionally comprises a central unit, usually with microprocessor, in which the transfer of information takes place through buses (data bus, address bus, control bus). This central unit communicates with the outside and in particular with the input/output connection elements of the controller by means of input/output circuits connected to the buses generated by the microprocessor.

Generally, these input/output circuits are formed on one or more printed circuit boards each combining a predetermined number of input and/or output channels.

Each of these channels ends in a multipole input or output materialized by an area for connection by poles to the printed circuit. It will be noted in this connection that twin pole inputs and outputs are very often used and accessorily three pole outputs (AC outputs).

The connection areas may be advantageously disposed along a border of the printed circuit, on which border a terminal strip is connected, for example of the type described in the Republic of France patent Published under No. 2 544 556 on Oct. 19, 1984 in the name of the applicant. This terminal strip is more particularly intended for providing a disconnectable connection between said areas and the corresponding conductors connecting the controller to the detectors and to the actuators of the process.

Thus, in a controller of the kind previously described, the aim of the invention is first of all to provide a device for detecting anomalies in the transfer and processing of information between the central unit on the one hand, and the input/out circuits connected to the detectors and/or to the actuators, on the other.

To obtain these results, it has already been proposed, in the general case of connections between computers and peripherals, to effect the transmission of a parity bit associated with each word, by providing a repetition procedure when an error is discovered. However, this solution does not give a satisfactory result in systems having timing constraints similar to that of the limited cycle time that a programmable controller must comply with for the cyclic refreshment of its input/outputs (this cycle time being of the order of a few milliseconds). Moreover, in the field of programmable controllers, when the transmission system between the central unit and the inputs/outputs comprises safety devices, they consist either in repeating each exchange twice and validating it at each identical transmission, or in checking the correct operation of the connections by inserting test exchanges between the useful exchange cycles.

With test exchanges inserted between the useful cycles, it can be checked whether the connection between the central unit and the inputs/outputs operates well under certain circumstances. However, such a cyclic check of proper or improper operation only reveals permanent faults, but does not prevent some instantaneous disturbances such as parasites from affecting the useful transmission cycles.

The procedure which consists in repeating each exchange and in validating it when there is identity, has the advantage of considerably increasing the cycle time for refreshing the inputs/outputs.

In addition, it does not take into account the fact that, in the case of the controller, little information changes from one cycle to the other, which allows the information transmitted during the preceding cycle to be used for an additional cycle without major disadvantage for the correct monitoring of the automatic device concerned

SUMMARY OF THE INVENTION

The aim of the invention is then to overcome these disadvantages, more especially:

by using exclusively the correct transmissions between the central unit and the inputs/outputs for executing the programme in progress;

by detecting the errors in real time during each transmission in progress;

by inhibiting the effects of each erroneous transmission likely to disturb the correct execution of the sequence in progress of the automatic device concerned;

by arranging so that, in the case of an error in a reading transmission, the input/output image memory keeps the information stored at the last exchange received free from error, for an additional cycle, refreshment of the inputs/outputs kept then being carried out during the following cycle, and by arranging so that, in the case of an error of transmission in writing mode, the local memory situated in each input/output module will be left in the prior state for an additional cycle and refreshed in the following cycle.

To attain these results, the device of the invention comprises more particularly:

circuitry for computing the parity of each data word available for reading at its inputs;

circuitry for calculating the parity of each word presented, by writing, at the "given" connection areas between the bus and the output boards, circuitry for transmitting this parity calculated by the input, boards (output at the central unit), circuitry for calculating the parity of each corresponding word, by the central unit, circuitry for validating/invalidating the reading or writing in progress, depending on the conformity or non conformity discovered of the parity calculated by the central unit with that calculated by the input/output board during the exchange in progress.

BRIEF DESCRIPTION OF DRAWINGS

Embodiments of the invention will be described hereafter by way of non limitative examples with reference to the accompanying drawings in which.

DETAILED DESCRIPTION OF THE PREFERRED EMBODIMENT

Figure 1:
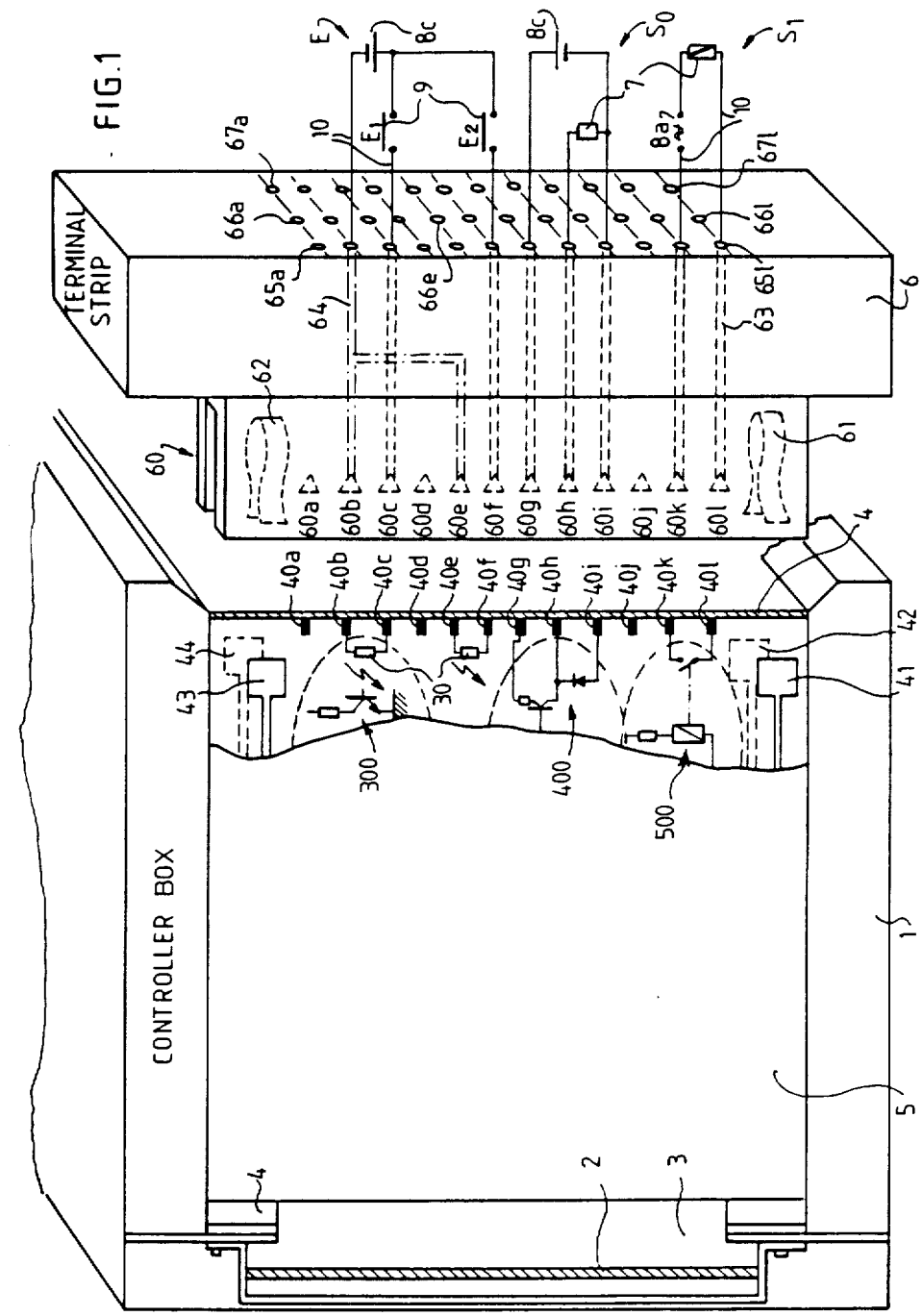
FIG. 1 is a schematical representation, in perspective and with parts cut away, of a controller box equipped with a terminal strip.

FIG. 1 shows a controller box 1 comprising in the bottom a printed circuit 2 disposed parallel to the bottom of the box. The printed circuit 2 gives material form to a data and address bus, as well as transmission and monitoring signal lines indicated hereafter. The purpose of the bus is to ensure transmission of the signals between a central unit (not shown) and input boards and/or output boards. The printed circuit 2 which supports the bus is connected by connector 3 to the rear face of an electronic input or output board 4, mounted in a protection case 5.

The connector 3 is a female clip connector which may receive the connection areas of the printed circuit forming the input or output board 4 oriented towards the bottom of the box.

The case 5 enclosing the electronic board 4 is partially cut away so as to show the connection areas of the front face of the printed circuit 4, as well as the part of the electronic circuits which may be mounted on the printed circuit so as to form either a two pole input board 300, or a two pole output board 500, or a three pole output board 400.

For the sake of convenience, the three possible circuit configurations have been shown on the same support medium 4; in actual fact, for an input board with eight DC or AC channels, the printed circuit 4 will comprise eight circuits 300. Similarly, for a twin pole AC output board with 12 channels, there will be twelve circuits 500 each ending in a connecting pair 40. Finally, for a DC output board 400 requiring three poles, the card will comprise as many times three areas as there are channels. Each circuit of type 300, 400, 500 ends in at least one pair of connection areas which have been designated by the references $40_a$ to $40_l$ and which are located on one face of the printed circuit. Furthermore, on each side of the printed circuit, conducting areas (43 and 44 and, respectively 41, 42) have been placed at the top and at the bottom, which areas are connected with the bus either through circuit 300, or circuit 400, or circuit 500. As will be explained further on, the front part 60 of a terminal strip 6 is connected to the board by fitting said front part in an opening, not shown, in case 5.

Figure 2:
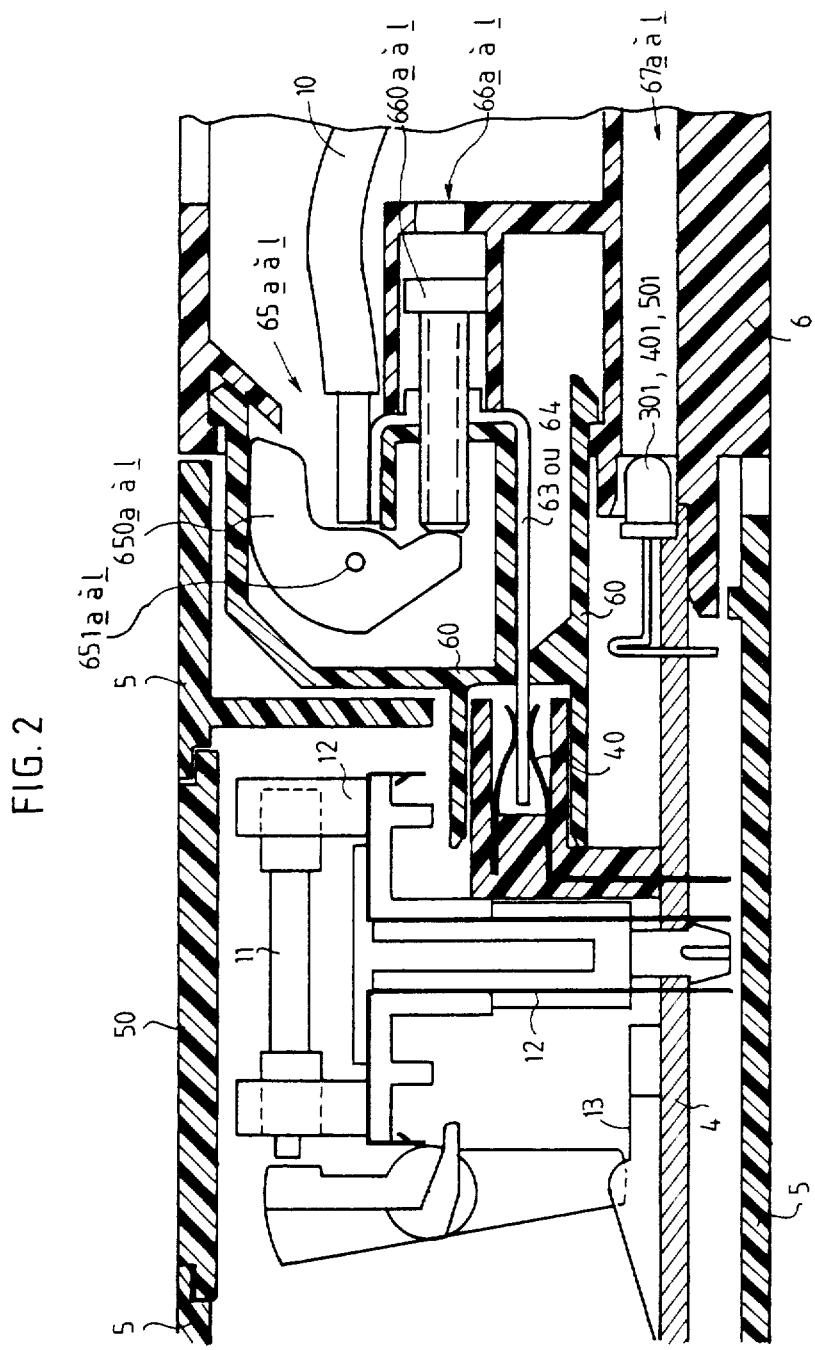
FIG. 2 is a partial schematical section illustrating the fitting of the terminal strip in a box such as the one shown in FIG. 1.

The front part of the terminal strip comprises a succession ($60_a$ to $60_l$) of connecting means adapted for establishing electric contact with the respective conducting areas $40_a$ to $40_l$ of the printed circuit 4. These means may be a female clip connector receiving the front edge of the printed circuit carrying the contact areas $40_a$ to $40_l$. The contact areas $40_a$ to $40_l$ may also be replaced by a female connector 40 which receives contact knives 63 or 64, as shown in FIG. 2, or any other possible connector arrangement.

Furthermore, on each side of the connection means $60_a$ to $60_l$ there is disposed, at the top and at the bottom respectively a contact lyre 62, 61. These lyres 61, 62 establish an electrical connection, between areas, 41, 42 for the lower lyre 61, between areas 43, 44 for the top lyre 62, when the terminal strip 6 is plugged into the board.

The positions of the lyres 61, 62 and of the contact areas 41, 42; 43, 44 are arranged so that one of the electric connections between areas 41, 42, 43, 44 is open before the connection means $60_1$ to $60_l$ are unplugged from areas $40_a$ to $40_l$. Conversely, the connection means $60_a$ to $60_l$ will be connected to areas $40_a$ to $40_l$ before the lyres 61, 62 establish the electric connections between areas 41, 42, respectively 43, 44, when the terminal strip 6 is plugged into the printed circuit 4.

This arrangement has the advantage of allowing an action for removing the terminal strip to be detected and, consequently, to set the outputs at zero or inhibit the data inputs of the board whose terminal strip is being handled with a view to disconnecting it. In addition, when the terminal strip is plugged in, as will be explained further on, the central unit is informed thereof and may supply the outputs of the board or validate the inputs thus connected.

The connection means $60_a$ to $60_l$ are connected through direct 63 or shunt 64 electric connections to external connection terminals $65_a$ to 65 $_l$.

Thus, as can be seen in FIG. 1, depending on the configuration of the terminal strip 6, some connections between opposite terminals $60_a$, $65_a$ do not exist whereas the opposite terminals 60c, 65c are connected directly together.

For further details concerning an embodiment of the terminal strip, reference may be made to the French patent application filed on Apr. 15, 1983 under the number 83 06175 in the name of LA TELEMECANIQUE ELECTRIQUE for: "Shunt terminal strip".

The external terminals 65b, 65c, 65f are connected by conducting wires 10 to an amssembly 9 of input sensors formed for example by end of travel switches. These sensors are fed from a DC voltage source $8_c$ so as to form a positive logic DC input circuit E, shown in FIG. 1.

The external terminal $65_g$ is connected by a conducting wire 10 to the positive terminal of a DC voltage source $8_c$ whose negative terminal is connected to terminal $65_l$. An actuator 7 is connected, on the one hand to terminal $65_h$ and, on the other, to terminal $65_i$, so as to form a positive logic DC output circuit $S_O$. The external terminal $65_k$ is connected by a conducting wire 10 to a terminal of an AC voltage source whose other terminal is connected to a load 7, formed for example by an electromagnet, whose other terminal is connected to the external terminal 65$_l$. This circuit forms an AC output circuit S$_l$.

The configuration of a negative logic DC input circuit and of a negative logic DC output circuit can be readily deduced from the foregoing, by reversing the connections of the DC sources. At the side of each external terminal 65$_a$, 65$_l$ there is provided an orifice 66$_a$ to 66$_l$ and a light guide 67$_a$ to 67$_l$. These elements of each assembly: terminal, orifice and light guide are disposed in the same horizontal plane.

In FIG. 2, it can be seen that orifices 66$_a$ to 66$_l$ give access to a set screw 660$_a$ to 660$_l$ which causes cams 650$_a$ to 650$_l$ to pivot about their axes 651$_a$ to 651$_l$ so as to immobilize the bared parts of the conducting wires 10 against the conducting surfaces of the electric connections 63 or 64 connecting the conducting wire to a female connector 40 which establishes the connections with the different electronic circuits supported by a board 4.

Fault indicating light emitting diodes 301, 401, 501, specific or common to several channels, are disposed opposite some light guides 67$_a$ to 67$_l$ and are connected electrically to one of the circuits 300, 400 or 500, depending on the type of board used. Plunger fuses 11 may also be mounted on the board so as to provide fusion detection, with fault display and signal, as will be explained further on in connection with FIG. 5.

Figure 3:
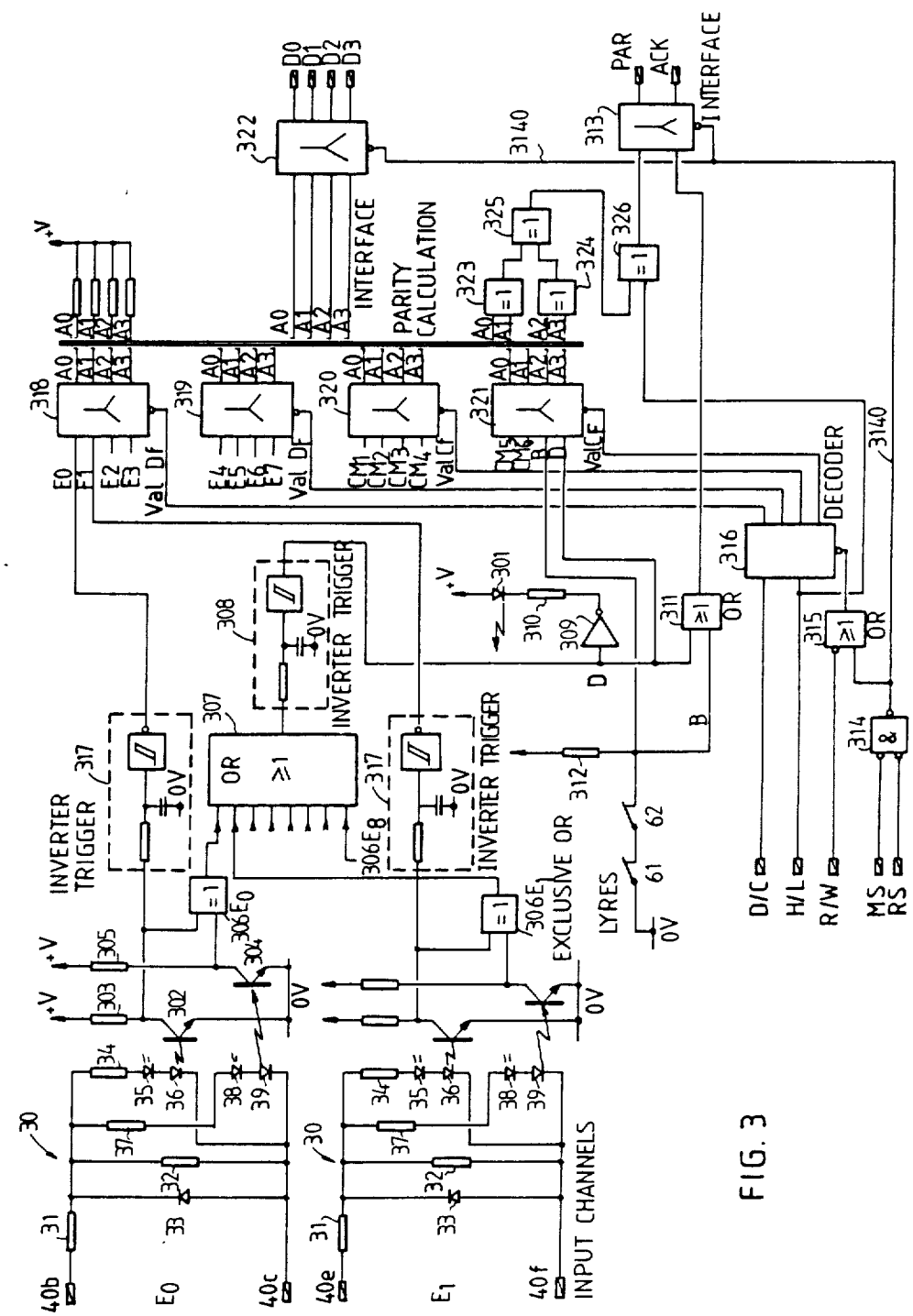
FIG. 3 is a general diagram of an input circuit for transmitting information between the central unit of the controller and the sensors or the detectors of the controlled process.

FIG. 3 shows the electronic fault signalling and information transmission circuit of an input board, usable with external circuits of the type shown by the reference E in FIG. 1.

In FIG. 1, a two channel input circuit E has been shown, ie using two sensors; this circuit is associated in the example considered with an internal shunt terminal. It is obvious, and that is clear from reading the above mentioned patent application, that the terminal strip could be of the direct connection, internal shunt, or external shunt kind or have a combination of the three above mentioned possibilities.

In all cases, whatever the type of terminal strip used, that does not modify the wiring 300 of board 4. The choice of the type of terminal strip only modifies the wiring of the external input circuit E.

In FIG. 3, two input channels 30 have been shown, galvanically decoupled by optocouplers, for the circuits 300 connected to the bus of the controller materialized by circuit 2.

The contact area 40$b$ is connected by two series resistors 31, 32 to the contact area 40$c$. The cathode of a protection Zener diode 33 is connected to the common point of the two resistors 31, 32 whereas the anode is connected to terminal 40$c$.

A first circuit, in parallel across said resistor 32, comprises in series a resistor 34, a light emitting diode 35 for displaying the status of the input circuit and an infrared emitting diode 36 associated as an optocoupler with the phototransistor 302.

A second circuit in parallel across said resistor 32 comprises in series a resistor 37, a threshold balancing diode 38 and an infrared emitting diode 39 associated as an optocoupler with a phototransistor 304. Between the contact areas 40$e$ and 40$p$ is to be found an input E$_1$ identical to the input E$_0$ described above.

The status display diode 35 of the first channel is disposed on the board so as to be situated opposite the light guide 67$c$ when the terminal strip is in position, whwereas the corresponding diode of the second channel 35 is then disposed opposite guide 67$f$.

Thus, the operating status of each input circuit E is displayed by the corresponding light emitting diode 35, the procedure is the same for the other channels in the case of a multichannel board. The following description will be limited to a single channel.

When the input E$_0$ receives through an enabled sensor the voltage signal causing it to pass to logic state "1", the infrared emitting diode 36 lights up and saturates the phototransistor 302 whose emitter is connected to ground and whose collector is loaded by a resistor 303 itself connected to a positive voltage source; simultaneously, because of the same voltage signal applied to E$_0$, the infrared emitting diode 39 lights up and saturates the phototransistor 304, whose emitter is connected to ground and whose commutator is loaded by a resistor 305 connected to said positive voltage source.

The collectors of the phototransistors 304 and 302 are connected to the two inputs of the "EXCLUSIVE OR" function of circuit 306.

In normal operation, this input circuit 30 simultaneously saturates or disables the two phototransistors 304 and 302 depending on whether the corresponding external sensor is closed or open; the simultaneity of this switching ensures the permanence of the identity of the signals applied to the "EXCLUSIVE OR" 306 whose output then remains at zero.

On the other hand, in the case of a fault in one of the two parallel legs, for example in leg 34, 35, 36, 302, whose phototransistor remains disabled despite the application of the required voltage at input E$_1$, the signals received by the "EXCLUSIVE OR" 306, differ, which allows a fault signal to be obtained. If, on the contrary, a fault causes the phototransistor 302 to conduct permanently, in the absence of a signal at the terminals of the input 30 concerned and, consequently, in the absence of current in the parallel leg 37, 38, 39, 304, and the non concordance of status of the two phototransistors 302, 304 is detected by the "EXCLUSIVE OR" 306, which then generates a fault signal.

In the two examples above, it has been shown that a fault in leg 34, 35, 36, 302 is detected if it causes non concordance between the logic state present at the terminals of input 30 and the logic state applied, via the optocoupler 302, to the cifcuits communicating with the central unit over the input/output bus. When comparable faults occur in the parallel leg 37, 38, 39, 304, they cause non concordance between, on the one hand, the logic state intended for the central unit and present at the collector of the optocoupler 302 and, on the other hand, the logic state intended for the monitoring "EXCLUSIVE OR" 306 and present at the collector of the optocoupler 304. This non concordance also generates a fault signal at the output of circuit 306.

Summarizing the different examples given above, it can be seen that in normal operation the signal present at the collector of phototransistor 304 serves for validating the signal present at the collector of phototransistor 302 and intended for the central unit; on the other hand, in the case of deterioration of the signal input interface formed by leg 34, 35, 36, 302 or of the monitoring interface formed by leg 37, 38, 39, 304, the "EXCLUSIVE OR" generates a fault signal which means either that the logic information available for the central unit is erroneous or that the corresponding input circuit 30, 300 is no longer able to confirm that the logic signal available for the central unit is identical to the one applied at the input.

For simplifying the input board shown in FIG. 3 and limiting the additional cost incurred by this false detection, the different "EXCLUSIVE OR"s 306 of the input interfaces which it groups together are all connected to a common "OR" circuit 307 which thus centralizes the possible fault signals of the same board. Of course, a possible variant of this input circuit with incorporated self monitoring would consist in transferring the verification of concordance of the signal intended for the central unit and its monitoring signal as far as possible towards the input/output bus; however, such variants would lead to more complex and more expensive boards, without providing substantial improvement in the terms of reliability of operation of the automatic device monitored by such inputs. In fact, experience acquired on the reliability of the different components used in these input circuits shows that deterioration of the optocouplers causes the great majority of faults leading to non concordance between the signal at the input terminals and the signal intended for the central unit; this is why the redundance concerning each input to the control and status detection circuits is limited to two optocouplers monitoring each other mutually 34, 35, 36, 302 and 37, 38, 39, 304.

To avoid untimely transitory alarms which switching time differences in the two logic legs connected to each "EXCLUSIVE OR" might cause, the output of the "OR" 307 is filtered by the circuit 308, which comprises an integrator followed by a trigger and only transmits a logic "1" to line D in the case of a significant non concordance.

On the one hand, this logic "1" is used locally on the board for displaying the presence of a fault by energizing the light emitting diode 301 through the amplifier 309 and resistor 310; furthermore, this line D is also connected to one of the two inputs of another "OR" circuit 311, whose output signal is transmitted to the terminal ACK for connection to the bus when the interface 313 is validated.

The other input of this "OR" 311 receives the line B, which is connected to a +V voltage source by the resistor 312 and is set to zero volt through contacts 61 and 62. These contacts 61 and 62 symbolize the electrical connections formed between the areas 41, 42 on the one hand and 43, 44 on the other through the lyres 61, 62 of FIG. 1.

The terminal strip 6 in position on board 4 keeps line B at zero volt through the lyre 61, 62: during disconnection of this terminal strip from said board and before connections 40–60 are opened, at least one of the lyres 61, 62 resets line B at zero, on which a logic "1" signal appears transmitted by the "OR" 311 and present at the terminal ACK connecting to the bus when the interface circuit 313 is enabled.

Considering the switching conditions thus described for lines D and B, it can be seen that the signal appearing at the terminal ACK, when the interface 313 is enabled, is a logic "0" when the terminal strip 6 is in position and when no non concordance is detected in the different input channels of the board; on the other hand, the beginning of terminal strip disconnection or any non concordance will cause a signal "1" to appear at said terminal ACK when said interface 313 is enabled: this signal ACK is then used by the central unit so as to take into account only the input information coming from boards having no non concordance fault and whose external connection terminal is in position.

The above mentioned lines B and D are further connected to two inputs of the same name of the interface circuit 321 so that the central unit can identify a fault by reading each of the signals B and D.

After this detailed description of the elaboration and of the local processing of the "concordance fault" (D) and "terminal strip disconnection" (B) signals, the rest of the functions of the input interface shown in FIG. 3 will now be described. It has already been shown how the application of a voltage signal representing the logic level "1" to the terminals 40$b$, 40$c$ of the input E$_0$ saturates the phototransistor 302 and then causes a logic "0" to appear between its collector and the zero volt.

To eliminate brief disturbances, such as those caused by bouncing of sensor contacts and certain oscillations generated by the logic circuits receiving input signals which are too slow, the logic signal of the collector of the phototransistor 302 is filtered and shaped by an inverter trigger in circuit 317. The logic "1" which results from this processing is applied to the input E$_0$ of the interface 318, which also receives the logic signals E$_1$, E$_2$, and E$_3$ after shaping by identical circuits.

Similarly, the interface circuit 319 receives, after shaping, the logic signals E$_4$, E$_5$, E$_6$ and E$_7$.

The interfaces 320 and 321 further receive six fixed logic level CM1 to CM6 forming a code specific to each type of input or output board, which signals the central unit may read for identifying or checking the input/output configuration present in the bus. We next describe the elaboration or derivation process used or generating the four words of four bits ($E_0E_1E_2E_3$/$E_4E_5E_6E_7$/CM$_1$, CM$_2$, CM$_3$, CM$_4$/CM$_5$, CM$_6$, B,D) respectively available at the input of the interface circuits 318, 319, 320, 321 the operation after this, of the circuits of FIG. 3 will be explained during its interrogation by the central unit. For reading the status of the inputs E$_0$ to E$_7$ or the status word of the board formed from the module codes CM$_1$ to CM$_6$ and signals "B" and "D" the central unit begins by selecting the address of the input board concerned while reestting to 0 the signals from bus RS and MS applied to the two inverting inputs of the "NAND" circuit 314 which generates a logic zero which the direct input of the "OR" circuit 315 receives while its inverting input is set to 1 by the signal R/W coming from the central unit; this circuit 315 generates a "0 " for validating the decoder circuit 316, which the central unit uses through combined signals D/C and H/L for individually selecting each word of four bits E$_0$ to E$_3$, E$_4$ to E$_7$, CM$_1$ to CM$_4$, CM$_5$ to D to be communicated to the bus D$_0$ to D$_3$ through its own interface 318, 319, 320 or 321 and the common interface 322.

The table of verity for this selection circuit is the following:

| MS and RS at zero R/W at 1 | D/C | H/L | VALIDATION SIGNAL (active at zero) |
|---|---|---|---|
| Low weight data reading E$_0$ to E$_3$ | 0 | 0 | Val D$_f$ = 0 |
| High weight data reading E$_4$ to E$_7$ | 0 | 1 | Val D$_F$ = 0 |
| Low weight module code reading CM$_1$ to CM$_4$ | 1 | 0 | Val C$_f$ = 0 |
| High weight module | | | |

| MS and RS at zero R/W at 1 | D/C | H/L | VALIDATION SIGNAL (active at zero) |
|---|---|---|---|
| code reading CM₅ to D | 1 | 1 | Val $C_F = 0$ |

The reading of the inputs $E_0$ to $E_3$ will now be examined in detail: the validation previously described of interface 318 applies this four bit word both to the input of the bus interface circuit 322 and to the parity calculating device formed by the "EXCLUSIVE OR"s 323, 324, 325; the "EXCLUSIVE OR" 326 calculates the parity of five binary signals: the signal H/L associated with the four bits of the word presented on the bus by validation of the interface 322. When the signals MS and RS select this board, as was explained above the output of circuit 314 goes to zero; line 3140 transmits this zero to the interfaces 313 and 322 and validates them.

The central unit then reads simultaneously the four bit word $E_0$ to $E_3$ on lines $D_0$ to $D_3$, the parity calculated at the source "PAR" and the signal ACK which is at zero when the terminal board is in place and when no fault has been detected on this input board.

At reception, the central unit calculates the parity of the word formed by the four bits $D_0$ to $D_3$ present on the bus with the signal H/L which it applies to said bus and compares this calculated parity on arrival with that transmitted by the line "PAR": it stores this word $D_0$ to $D_3$ in the input/output image memory only if the parities coincide and if the signal ACK=0; in the other cases the central unit is warned in real time, of an anomaly and procedes as follows:

If ACK=0 and if a parity divergence is found, it keeps the data stored in the input/output image memory at the last reading which it validated and, depending on the system programming chosen by the designer, proceeds immediately, or in the next cycle, to a further reading of the same data: if ACK remains at "1"during this reading and if the parity check finds a coincidence, the central unit is warned by this signal ACK of the fact that the data present on the bus is doubtful; by programming, the designer of the automatic device will chose a procedure for rapid shutdown or for maintaining reduced operation with signalling of a fault depending on the address of the board concerned, that is to say, depending on the impact of possible false information coming from the corresponding inputs on the correct operation and cycling reliability of the monitored automatic device.

The central unit procedes in the same way for reading the inputs $E_4$ to $E_7$ and, if required, the different module codes by selecting the desired word by the corresponding combination H/L, D/C indicated by the table of verity of the decoder 316; each reading gives rise to the same validation checks, through the signals PAR and ACK emitted with the selected word.

To sum up, the procedure and the device as described allow a programmable controller connected to input boards of the type shown in FIG. 3 to have permanently available reading accessible signals and representing the operating status D and the presence of the external connection terminal strip and the correct operating state of the interrogated card and the conformity of the parities between words emitted and received to be checked, before validation of each input word. For economic reasons, a partial version of the solution shown in FIG. 4 may be preferred, which version comprises neither the input redundance 37, 38, 39, 304, nor the concordance check 306, nor the use thereof 308, 309, 310, 301; with the thus simplified diagram, the signal "ACK" is only conditioned by the terminal strip connection signal B.

Figure 4:
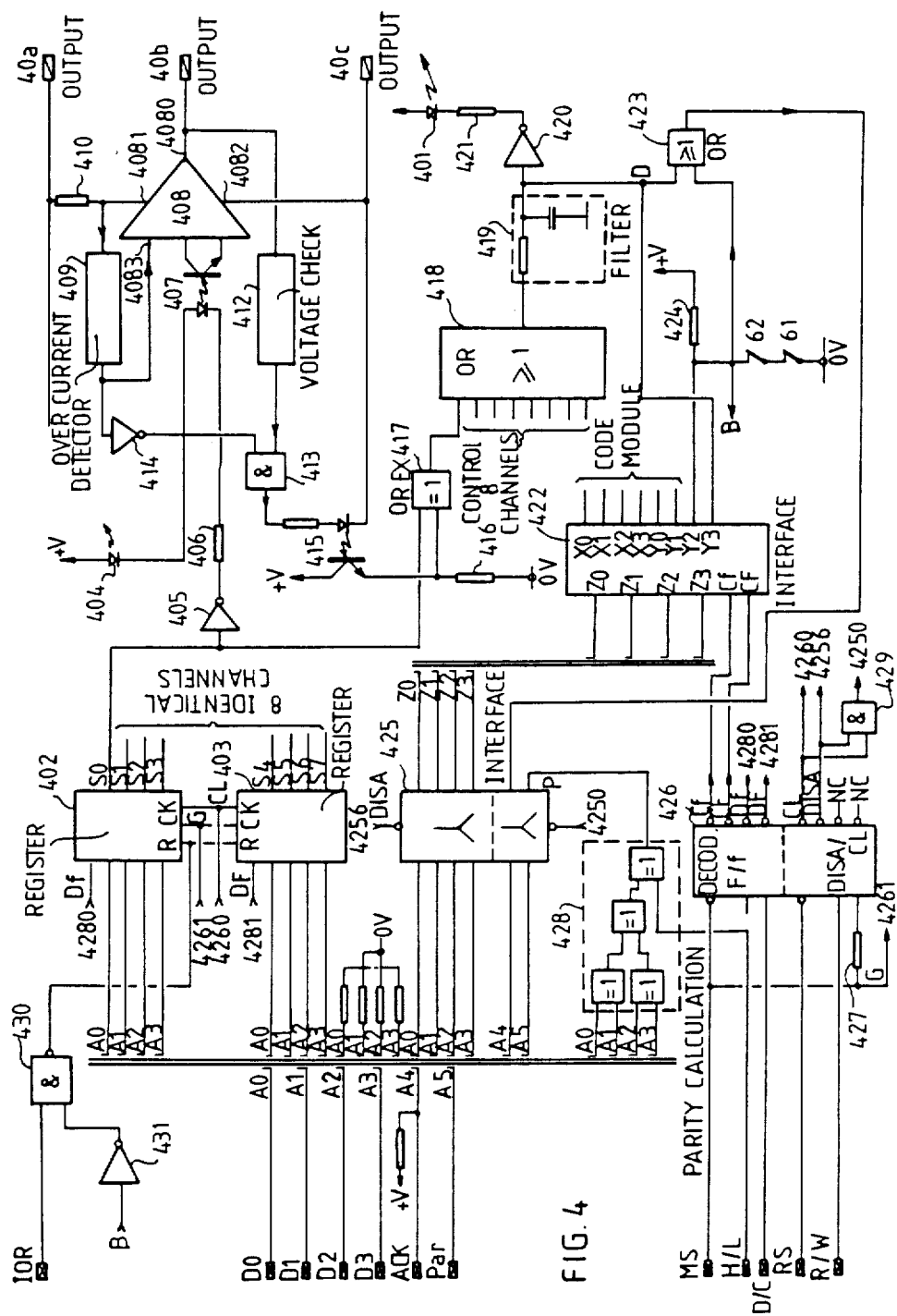
FIG. 4 is a general diagram of a three pole input/output circuit for transmitting information between the central unit of the controller and the actuators of the controlled process.

FIG. 4 shows the diagram of a DC eight channel output board of the "three wire" type, that is to say comprising, for each output such as $S_0$, a supply area $40_a$ (external +V), an output area to the load $40b$ and a third area $40c$ connecting the other pole of the amplifier 408 to the zero volt of the external power supply.

On the bus side, this board comprises connections required for the same signals as the input board of FIG. 3, but it operates differently: contrary to the inputs which only operate for reading, the output boards of the model shown in FIG. 4 are accessible for writing so as to control the status of each output and in reading for acquiring or checking the module code and the B and D information (terminal strip presence, absence of fault) defined above.

The selection of the different operating modes of this board is provided from the signals:
MS module selection
RS rack selection
RW reading/writing
D/C data/code
H/L high weights/low weights These signals are clarified by the decoder circuit 426 in accordance to the following table of verity:

| MS AND RS AT ZERO | R/W | D/C | H/L | Signal and writing validation conditions |
|---|---|---|---|---|
| Low weight data data selection $D_0$ to $D_3$ | 0 | 0 | 0 | CL = 0 $D_f = 0$ wrtitng in $S_0$ to $S_3$ if RS rises before MS |
| High weight data selection $D_4$ to $D_7$ | 0 | 0 | 1 | CL = 0 $D_F = 0$ writing in $S_4$ to $S_3$ if RS rises before MS |
| Low weight code reading | 1 | 1 | 0 | DISA = 0 $C_f = 0$ |
| High weight code reading | 1 | 1 | 1 | DISA = 0 $c_F = 0$ |

In low weight writing exchange, the central unit presents on the wires of bus $D_0$ to $D_3$ the signals intended for controlling the outputs $S_0$ to $S_3$ and selects the board, the outputs concerned and the writing mode by making RS and MS=O, H/L and D/C=O, R/W=O.

When these signals appear on the corresponding areas of the board of FIG. 4, the four "EXCLUSIVE OR"s of circuit 428 calculate the parity received from signals $D_0$ to $D_3$ combined with H/L: receiving the signals CL=0 from the decoder 426, the AND circuit 429 generates, at its output 4250, a zero signal which validates the channels $A_4$ and $A_5$ of the interface 425; the selected card then sends back to the central unit over $A_5$, a parity calculated from the signals received and, over $A_4$, the signal ACK coming from the "OR" circuit 423, which signal is at zero when the terminal strip is in position and in the absence of a fault detected on the board.

Receiving in return this parity of the signals present on the inputs of the registers storing the status of the outputs 402, 403, the central unit compares it with the parity which it has itself calculated at the source: if these parities coincide and if the signal ACK is at zero, the central unit validates this writing exchange by storing the signals $D_0$ to $D_3$ in the flip flops $S_0$ to $S_3$ of the circuit 402.

To validate this storage, the central unit causes the signal RS to rise before the signal MS, which causes the signal CL applied by line 4260 of circuit 402 to rise while the signal G (=MS) received over line 4261 by the same circuit is still at zero this rising order of the signals G and CL applied to circuit 402 stores the data present on lines $D_0$ to $D_3$ in flip flops $S_0$ $S_3$, in the place of the data previously received. On the contrary, should an error of parity be found by the central unit, this latter inhibits the data present at the inputs of register 402 by causing the signal MS (=G) to rise before RS so before L; this sequence allows the controller to keep the outputs $S_0$ to $S_3$ in the status corresponding to the orders received during the last validated exchange so as to update them only with the data, the correct transmission of which has been ascertained, in real time, by the central unit.

Before considering the cases in which the board shown in FIG. 4 selected by MS and RS has one or more anomalies preventing it from sending back to the central unit the signal ACK=O, the complete description of the output circuit connected to the connection $S_0$ of register 402 will be finished. When $S_O$ is at level 1, the inverter 405 supplies the series circuit starting from +V and comprising the light emitting diode 404, the infrared emitting diode of the optocoupler 407 and resistor 406; the control signal $S_0$ stored locally by the register 402 is therefore displayed by diode 404 via the light guide 67b of the terminal strip and is transferred to the output amplifier 408 by the optocoupler 407.

This amplifier 408 is connected to an external DC power supply through areas 40a (+) and 40c and it connects the area 40b, through resistor 410, to area 40a, when the optocoupler 407 is conducting.

In normal operation, when $S_0$=1, the load connected between areas 40b and 40c receives a voltage very close to that of the external power supply (the current sensor 410 being a low value resistor; the over current detector 409 then generates a zero transformed into 1 by the inverter 414, whereas the voltage check 412 associates a signal 1 with the presence of voltage between 40b and 40c; the AND circuit 413 then generates a signal 1 which energizes the optocoupler 415, through the resistor 4150 in series with its infrared emitting diode; its phototransistor then supplies the resistor 416 connected as a load in its emitter, which generates a 1 at one of the inputs of the "EXCLUSIVE OR" 417, whose other input receives directly the signal $S_0$; concordance of the command $S_0$=1 and of the execution of this command by amplifier 408 generates then two "1"s at the inputs of the circuit 417, whose output remains at zero. Similarly, when the status stored in register 402 is $S_0$=0, the optocoupler 407 and the amplifier 408 remain disabled; this same exclusive "OR" 417 then ascertains the concordance between command and execution and its output still remains at zero. On the other hand, when a load anomaly causes an overcurrent detected by circuit 409, this circuit generates a 1 which causes the current limiter of the amplifier 408 to come into play by acting on the connection 4083; this disturbance in execution of command $S_0$=1 is transmitted by the inverter 414 to the "AND" 413, whose output passes to zero, which disables the optocoupler 415; the "EXCLUSIVE OR" 417 then receives different signals; it generates a 1 corresponding to a non concordance fault between control signal $S_0$ and the output status 40b of the corresponding channel.

Similarly, if the absence of external voltage between ares 40a and 40c, or any other fault at this output, prevents the voltage from appearing between areas 40b and 40c, despite the presence of a command $S_0$=1, the circuit 412 ascertains this absence of voltage and generates a zero, which also disables the optocoupler 415 and further generates a fault signal at the output of the "EXCLUSIVE OR" 417. Furthermore, in the case of a reduced output remaining conducting despite a zero control signal, the non concordance again generates D. So as to limit the additional cost of these monitoring circuits, the fault signals from circuits 417 of each channel are all grouped together by the "OR" circuit 418, whose output is filtered by the resistance-capacity circuit 419 so as to avoid transitory alarms due to the switching times of the components; the signal D common to the eight channels of the board is inverted by circuit 420 and controls the fault display light emitting diode 401 through the resistor 421; this fault display diode, of a different color, is mounted facing a free light guide of the terminal strip.

On the other hand, this signal D=1 sets the outputs of the "OR" 423 to 1 which prevents the board from sending back a signal ACK=0 when it is selected by MS and RS=0; the central unit is therefore informed of an anomaly in the execution of its orders by the output board concerned and reacts according to the fault procedure adopted by the designer with respect to the eight outputs concerned (maintenance in reduced operation with alarm or fault shut down of the whole of the automatic device). It will also be noted that the signal D is applied to $Y_3$ as an element of the module code which the central unit may read under the conditions described further on.

The role of the terminal strip presence contacts 61 and 62 will now be explained:

When disconnection of the connection terminal strip from the board shown in FIG. 9 begins, whereas its output $S_0$ is conducting, one of the contacts 61, 62 opens first and B passes to 1; the output of the inverter 431 then passes to zero and the "NAND" 430 causes R to pass to 1, which causes resetting of the eight channels of registers 402 and 403 before the output connections 40/60 are open; this automatic resetting at the beginning of disconnection of the terminal strip therefore avoids breaks under load which may damage the connections 40/60.

This signal B is furthermore used by the "OR" circuit 423 for warning the central unit of an anomaly by preventing the board selected by MS and RS=0 from replying, for the signal ACK then remains at 1. It will be further noted that this same signal B is applied at $Y_2$ as element of the module code accessible by the central unit for reading.

The above detailed description concerning the writing functions of the board shown in FIG. 4 and, more especially, of its channel $S_0$, is applicable to the seven other outputs, providing that the selection H/L is complied with for addressing the respective commands in accordance with the table of verity given for circuit 426.

The operation of the devices used during reading will now be explained. On the output board shown in FIG.

4, the elements accessible by the central unit for reading form the status word of said board, which comprises the six bits of the module code specific to the output function concerned (type, modularity, etc) and the above described terminal B and fault D signals.

If we consider, for example, the reading of the last four bits enumerated above, selection thereof is made by the central unit according to the table of verity of decoder 426 by the signals selecting this same board MS and RS=1 R/W, D/C and H/L=1; this decoder then generates DISA and CF=0.

The signal $C_F=0$ applies the word to be read to the four outputs $2_0$ to $2_3$ of the interface 422, which outputs are connected to the inputs of the same name of interface 425; the signal DISA=0 applied by lien 4256 validates the interface 425 and this word appears on lines $A_0$ to $A_3$ and areas $D_0$ to $D_3$ connected to the bus.

The circuit 422 then calculates the parity of this word in combination with the signal H/L=1and this parity at the source is applied to the line PAR of the bus via the line $A_5$ of the interface 425 whose outputs $A_4$ and $A_5$ are validated by the signal DISA=0 via the AND circuit 429 which retransmits this zero to the connection 4250 of said interface circuit; this validation connects the output of the "OR" circuit 423 to the line ACK of the bus, which will therefore be at zero only in the absence of a fault D and only if the terminal strip is in position B=0. Receiving over the bus the data $D_0$ to $D_3$ and the parity calculated at the source, it calculates the parity received in combination with H/L=1 and only validates this configuration status check reading if these parities are identical.

Under the same conditions, except that the signal H/L is set to zero, the central unit reads the four low weight bits of the module code associated with their parity at the source and with the signal ACK if B and D=0.

It will be noted that the absence of ACK=0 signals an anomaly to the central unit, but does not prevent it either from reading the status word, or from writing the outputs which are operating on a board having anomalies and a signal D=1; only disconnection of the terminal strip prevents writing of the outputs by forcing them to zero.

Figure 5:
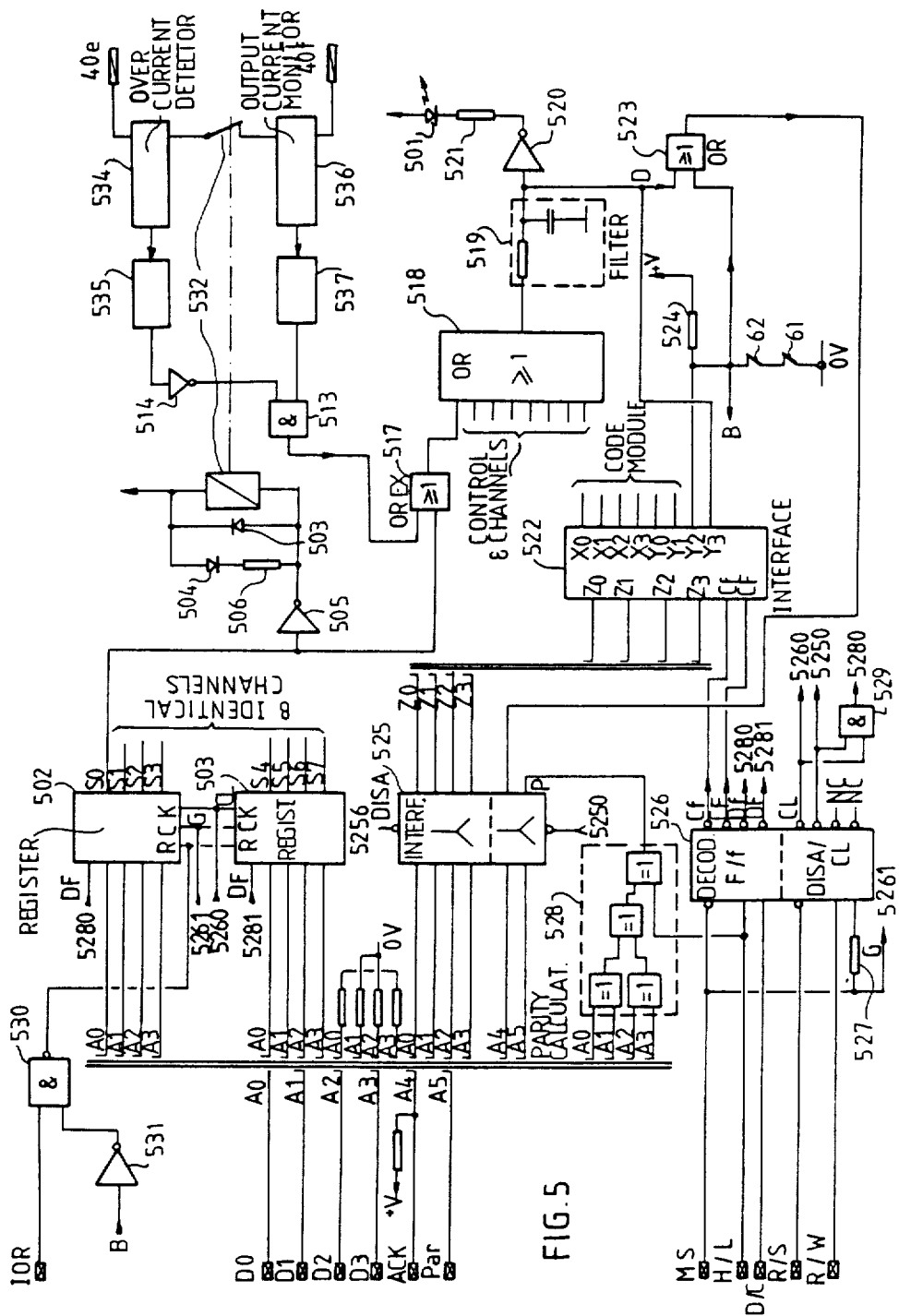
FIG. 5 is a general diagram of a twin pole input/output circuit whose output element, for controlling the process actuators, consists of a relay.

FIG. 5 shows one embodiment of an eight output board with relay for AC current, using only two connection terminals per channel and comprising the same operating checks as that shown in FIG. 4. For designating the elements and circuits identical to those shown in FIG. 4, the hundreds figure has been increased from 4 to 5.

Description of FIG. 5 will be limited to the new devices which it comprises and whose numbers have been changed.

The new output circuit concerned is entirely situated between the output of the inverter 505 and the inputs of the monitoring circuits 513 and 514. The output signal from this inverter amplifier 505 controls a relay 532 show coil is connected across a retrieval diode and whose contact is connected in series with an overcurrent detector 534 and an output current monitoring circuit 536 between the areas 40c and 40b.

When the output $S_0$ of register 502 is at 1, relay 532 is energized; its status is displayed by the light emitting diode 504 and its contact closes the above mentioned series circuit between areas 40c and 40b. If the external circuit which comprises a power supply and an output controlled actuator, operates normally the overcurrent detector 534 remains at zero, whereas the output current controller 536 passes to 1; the "EXCLUSIVE OR" 517 then ascertains the concordance between the command signal $S_0$ and its execution.

As for the different above cases of non concordance, said circuit 517 generates a fault signal displayed and processed in the same conditions.

Figure 6:
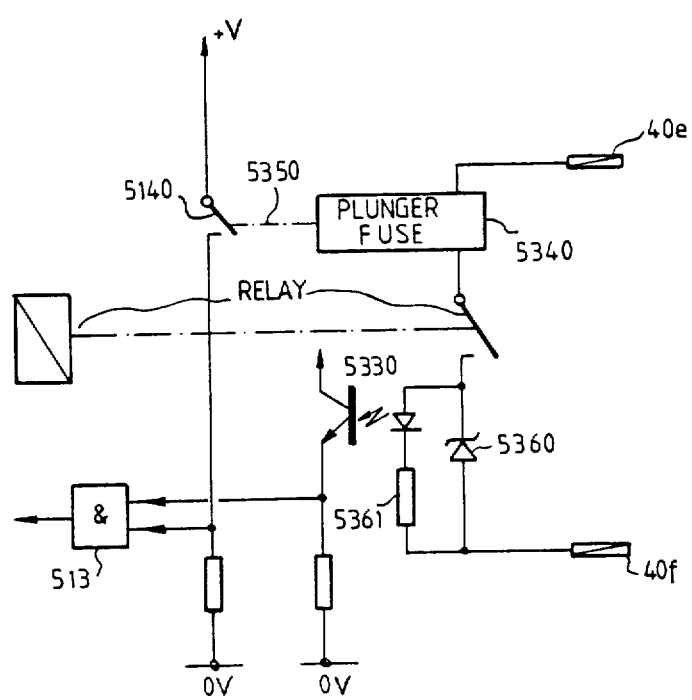
FIG. 6 is a diagram of a variation of the output stage of the input/output circuit shown in FIG. 5.

FIG. 6 illustrates one embodiment of the functions 534 and 536 using an overcurrent detector formed by a plunger fuse 5340 which actuates a contact 5140 through an insulating piece 5350 and an output current monitor formed from a low voltage series Zener diode 5360, in parallel with the emitting diode of an optocoupler 5330 and a resistor 5361.

Since the rest of the diagram shown in FIG. 5 is identical to the one shown in FIG. 4, we find again all the elements for dialoging with the central unit, the operation of which elements has been described above.

We claim:

1. An input/output device for monitoring transmission of information between a processor of a programmable controller, input circuits connected to sensors and output circuits connected to actuators, said processor comprising a central unit connected to a bus, means for transmitting to said bus first digital words in a parallel transmitting mode, means for generating for each of said first digital words, a first parity signal representative of the parity of this first digital word, means for comparing said first parity signal with a second parity signal transmitted by the device to the central unit, and means for transmitting to the device a control signal only when the first parity signal is concordant with the second parity signal, said input/output device comprising:

i-first connection areas connected to the bus so as to receive the first digital words;
ii-second connection areas connected to said input circuits so as to receive second digital words proceeding from the sensors;
iii-third connection areas connected to said output circuits so as to transmit third digital words to the actuators;
iv-first electronic circuits which connect said first connection areas to said second connection areas and which comprise means for deriving from said second digital words, input digital words, and means for transmitting in a parallel transmitting mode these input digital words to said processor through said first connection area and through said bus;
v-second electronic circuits connecting said first connection areas to the third connection areas, said second electronic circuit comprising at least a memory register having input terminals connected to the first connection areas so as to receive each of said first digital words, a memory unit, means for storing into the memory unit each digital word present on the input terminals, only upon reception of the said control signal, and output terminals which are connected to means for generating on the third connecting areas a third digital word representative of the first digital word stored in the memory unit, and
vi-a parity generator comprising means for calculating a second parity for each of the first digital words applied on the first connection areas, means for generating a second parity signal representative of this second parity, and means for transmitting the second parity signal to the central unit.

2. An input/output device according to claim 1, which further comprises means for calculating a third parity for each of said input digital words, said third parity being compared with a fourth parity calculated by the processor to detect possible anomalies.

* * * * *

UNITED STATES PATENT AND TRADEMARK OFFICE
CERTIFICATE OF CORRECTION

PATENT NO. : 4,864,531
DATED : September 5, 1989
INVENTOR(S) : Jesse T. Quatse et al.

It is certified that error appears in the above—identified patent and that said Letters Patent is hereby corrected as shown below:

On the title page, add the following information under item [63] Related U.S. Application Data:

-- (22) PCT Filed: June 1, 1984

(86) PCT No. PCT/FR84/00141

Sec. 371 Date: February 4, 1985

Sec. 102(e) Date: February 4, 1985

(87) PCT Publ No. WO 84/04976

PCT Pub. Date: December 20, 1984 --

Signed and Sealed this

Eighth Day of December, 1992

Attest:

DOUGLAS B. COMER

Attesting Officer     Acting Commissioner of Patents and Trademarks